Dec. 2, 1969   D. L. WENHAM   3,481,197
MILK YIELD METER

Filed July 6, 1967   4 Sheets-Sheet 1

INVENTOR
DOUGLAS LEE WENHAM
BY
Owen, Wickersham & Erickson
ATTORNEYS

Dec. 2, 1969   D. L. WENHAM   3,481,197
MILK YIELD METER

Filed July 6, 1967   4 Sheets-Sheet 2

INVENTOR
DOUGLAS LEE WENHAM
BY
ATTORNEYS

Dec. 2, 1969     D. L. WENHAM     3,481,197
MILK YIELD METER

Filed July 6, 1967     4 Sheets-Sheet 3

INVENTOR
DOUGLAS LEE WENHAM
BY
*Owen, Wickersham & Erickson*
ATTORNEYS

Dec. 2, 1969  D. L. WENHAM  3,481,197
MILK YIELD METER

Filed July 6, 1967  4 Sheets-Sheet 4

INVENTOR
DOUGLAS LEE WENHAM
BY
Owen, Wickersham & Erickson
ATTORNEYS

United States Patent Office 3,481,197
Patented Dec. 2, 1969

3,481,197
MILK YIELD METER
Douglas Lee Wenham, Hamilton, North Island, New Zealand, assignor to Plastic Products Limited, Hamilton, North Island, New Zealand, a corporation of New Zealand
Filed July 6, 1967, Ser. No. 651,623
Int. Cl. G01f 1/00
U.S. Cl. 73—202          10 Claims

ABSTRACT OF THE DISCLOSURE

The disclosure relates to a device for measuring the total quantity of milk yielded from a cow during a milking operation when connected to a milking machine. The yield indicator device comprises a chamber having a dome member forming a concave inner surface which is centrally aligned with and receives milk through an inlet tube. The dome surface causes the milk forced through the inlet tube to spread on it in a film which falls from its rim in a uniformly distributed curtain. A small but determinable portion of the falling milk curtain is diverted and trapped in a measuring flask while the remaining greater amount flows through an outlet to the milk supply. When the milking operation has been completed the amount of milk in the flask provides a measure of the total amount produced.

---

This invention relates to a milk yield indicator for application to milking machines, the invention being concerned with contrivances of the kind in which during a milking operation, a portion of the milk delivered by the cow is diverted from the main stream and used as an index to the total quantity of milk yielded by the cow at the end of the milking operation.

Milk yield indicating devices as hitherto constructed suffer from the drawback that, apart from certain mechanical faults, they do not take into sufficient account the fact that a number of variables exist during milking operations, among which may be mentioned variations in vacuum conditions; variations in air admission and air leaks around the teats; the pulsating flow of the milk froth mixture; the varying consistency in milk due for instance to different breeds of cows and the period of lactation, and differences of temperament between one cow and another. A further cause of inaccuracy is that in practice it is difficult to ensure that the meter is set up absolutely plumb which is necessary for most previous meters to function correctly. In consequence, these previous forms of meter do not always give an accurate indication of the total quantity of milk delivered by each particular cow.

A degree of inaccuracy is perhaps of no great importance for ordinary milking purposes, but complete accuracy or accuracy to within fine limits is very necessary where scientific herd testing and dairy research are undertaken, as errors in the yield figures can be so misleading as to cause mistakes to be made in breeding and upgrading routines.

The object of the present invention is to provide a device for indicating milk yield having one or more of the following advantages, namely: to measure accurately by weight, pounds avoirdupois or kilograms, the total milk yield from each cow, thus not only enabling the farmer to assess correctly the milking value of each of his cows, but also enabling the figure obtained to be used reliably for herd testing and research; in addition to giving accurate measurement, to divide off a proportion of the milk delivered from each cow so that this part can be used as a sample for butter fat and other quality valuations; to have very low resistance to milk flow, thus ensuring no noticeable reduction in milking rate; to be insensitive to variations of vacuum or air admission; to be easily reset after reading-off the milk yield figure; to be capable of being washed in situ with the rest of the milking machine after use, dismantling thus being unnecessary for this purpose. It is desirable that the device should have no small jet holes which are apt to become blocked and are difficult to clean; and it is desirable that the device comprises relatively few simple parts that can easily be manufactured, assembled and if necessary dismantled.

The milk yield indicator device of the present invention comprises a base plate; a cap or cover mounted on the base plate and shaped to provide a chamber between cap and base plate, the cap being provided at its upper end with a dome the concave face of which faces downwardly, lies within the said chamber and is of regular curvature in all cross sections; an inlet nozzle extending upwardly from the base plate so that it projects into the chamber and lies in line with the axis of the concave face of the dome, the upper end of the nozzle being spaced from the concave face of the dome, while the lower end of the nozzle is adapted for connection to the dropper or section of milk tube extending from the milk cups or milk cup claw, means associated with the inlet nozzle for creating a substantially even skin of milk in the bore of the inlet nozzle adjacent to the exit thereof; an outlet from the chamber adapted to be connected to the section of milk line extending to the releaser of the milking machine; a tubular divider extending upwardly from the base plate and having its upper open end lying directly beneath a part of the rim of the concave face of the dome; and a graduated measuring flask detachably connected to the lower end of the divider so that its interior is in communication with the bore of the divider.

One embodiment of a device incorporating the invention is illustrated in the accompanying drawings, in which.

Figure 1:
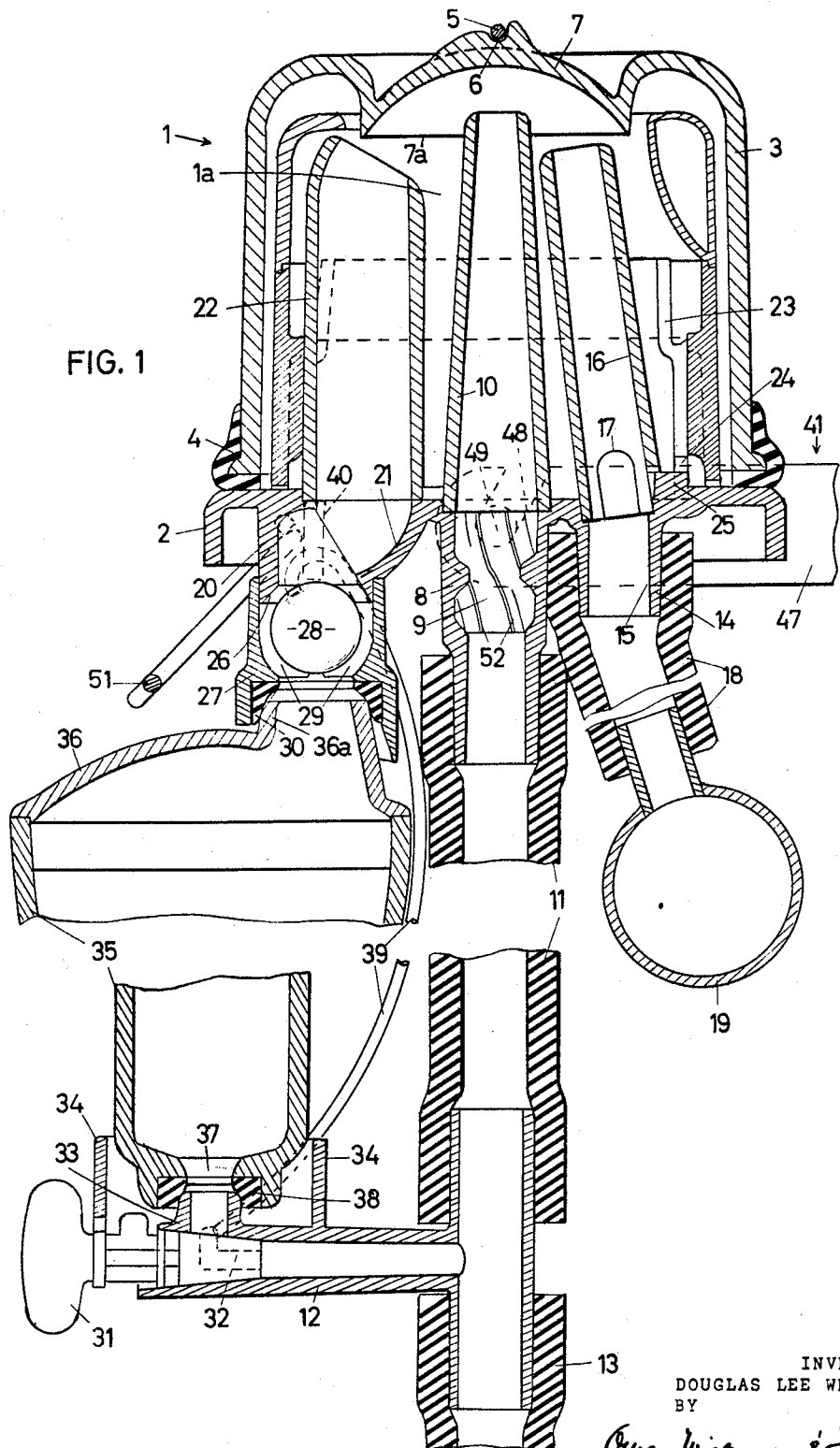
FIG. 1 is a vertical sectional view of the complete milk yield indicator.

As shown, the milk yield indicator comprises a head portion generally indicated at 1, this portion including a horizontally disposed circular base plate 2 having an upper face of recessed form, the raised marginal part of the base plate being surmounted by a cap 3. The cap is of inverted cup-like shape, a chamber 1a thus being formed between the cap and the base plate. The lower edge part of the cap 3 is fitted with a sealing ring 4 rubber or other suitable resilient material which seats on the marginal part of the base plate 2 to provide a leak-proof joint between the cap and base plate, the cap being held on the base plate by means of a releasable spring clip or yoke member 5 which is pivotally connected to the base plate and engages in a centrally disposed depression 6 (FIG. 1) formed in the outer face of the closed upper end of the cap.

The cap 3 is made from a rigid material and its closed upper end is shaped to provide a centrally disposed dome 7, the concave face of which faces downwardly so that it lies within the chamber 1a, the said face being in the form of part of a sphere so that it is of regular uniform curvature in all of its cross sections. Instead of the concave face of the dome 7 conforming to the shape of part of a sphere as just mentioned, this face may be of parabolic or other curved shape so long as it is uniform in all cross sections.

The base plate 2 is formed with a centrally positioned and downwardly projecting spigot 8 through which a vertically disposed hole 9 is formed. Around the upper end of this hole there is secured an upwardly extending inlet nozzle 10 which lies within the chamber 1a and the axis of which is in alignment with the axis of the concave face of the dome 7. The inlet nozzle is tapered in the direction of its upper end, this end being spaced below the concave face of the dome. To the lower end of the spigot 8 there is connected the upper end of a depending length of hose 11. At the lower end of the hose 11 there is provided a tubular adaptor 12 of reclining T-shape, this end of the hose being connected to the upwardly extending branch of the head of the adaptor. To the opposite and downwardly extending branch of the head of the adaptor 12 there is connected one end of a section of flexible tubing 13, the other end of which is connected to the milk cup claw (not shown) of the milking machine. The adaptor 12 has other constructional features which will be described later.

The base plate 2 of the head portion 1 of the meter is provided with an outlet in the form of a second downwardly extending spigot 14 which is radially offset from the spigot 8 and which has a vertically extending hole 15 opening at the upper face of the base plate and within the confines of the cap 3. My milk yield indicator may be used in conjunction with a milk flow indicator such as described and claimed in my U.S. patent application Ser. No. 651,505, filed on July 6, 1967. When this is done an outlet tube 16 is secured around the upper end of the hole 15 and extends upwardly into the chamber 1a, its upper end terminating at a distance below the upper end of the inlet nozzle 10. A slot or slots 17 are formed in the lower part of the side wall of the outlet tube 16, each slot providing a channel of communication between the lower part of the chamber 1a and the bore of the outlet tube. The lower end of the spigot 14 is adapted to be secured to one end of a length of hose 18, the other end of which is connected to the milk line 19 leading to the releaser (not shown) of the milking machine.

The base plate 2 is formed with a third downwardly projecting spigot 20 which contains a hole 21 the upper end of which opens at the upper face of the base plate and also within the confines of the cap 3. Around the upper end of the hole 21 there is provided a tubular divider 22 which is fixed to the upper face of the base plate 2 and projects upwardly into the chamber 1a, the upper open end of the divider being so positioned that it lies directly beneath a part of the rim 7a of the concave face of the dome 7. The divider 22 forms part of an endless wall member 23 which likewise is fixed to the upper face of the base plate 2. The wall member surrounds the inlet nozzle 10 and outlet tube 16, while being spaced inwardly of the side wall of the cap 3. The divider 22 is correctly located over the hole 21 in the spigot 20 by the provision in the lower edge of the wall member 23 of a slot 24 which engages over a key 25 formed on and projecting upwardly from the upper face of the base plate 2. The slot 24 is made of such height as to extend beyond the upper edge of the key 25, thus placing the lower part of the space within the wall member 23 in communication with the lower part of the space lying between this member and the cap 3.

The lower end of the spigot 20 is shaped to provide a valve seating 26 and around this end there is secured a downwardly projecting tubular housing 27 containing a valve in the form of a ball 28 which is adapted to cooperate with the seating 26. The ball 28 is normally out of engagement with the seating 26 and is supported for upward and downward movement within the housing 27 by means of upwardly extending ribs 29, projecting into the housing. With this arrangement, channels are left around the ball, these channels placing the interior of the divider 22 in communication with the lower end of the valve housing 27 so long as the ball valve 28 remains in its normal position. The lower end portion of the valve housing is of enlarged diameter and contains a sealing ring 30 of rubber or other suitable resilient material.

In the bore of the horizontal stem of the adaptor 12, there is fitted the tapered plug portion of a bib cock 31. The plug portion is formed with an L-shape passageway 32, one branch of which opens into the bore of the horizontal stem of the adaptor 12, while the other branch can, by rotating the cock, be brought into and out of register with a hole formed through a nipple 33 projecting upwardly from and forming part of the horizontal stem of the adaptor 12. A cylindrical collar 34 surrounds but is spaced from the nipple 33, the collar also forming part of the horizontal stem of the adaptor.

Between the valve housing 27 and the nipple 33, there is provided a measuring flask 35 (see FIG. 6) made of a rigid transparent material and marked with graduations to indicate, say, pounds or kilograms of milk delivered by the cow during a milking operation. The upper end of the flask 35 is fitted with a fixed lid 36 formed with an upwardly projecting tubular neck 36a which bears against the sealing ring 30 arranged within the lower end of the valve housing 27. The bottom of the flask is formed with a centrally disposed vertical hole 37, the lower end of which is surrounded by a sealing ring 38 of rubber or other suitable resilient material, the ring being accommodated in a recess formed in the bottom of the flask and resting on the nipple 33.

With the arrangement just described the flask 35, with its lid 36 and sealing ring 38, becomes supported between the sealing ring 30 and the nipple 33.

As the adaptor 12 is supported by the hose 11 which is flexible, it becomes necessary to ensure that the neck 36a of the lid 36 of the flask 35 is maintained in sufficiently close engagement with the sealing ring 30 and the sealing ring 38 in similar engagement with the nipple 33 as to form leakproof joints between these parts. At the same time it is required that the flask shall be so held in position that it can readily be removed and reapplied when desired. For these purposes, an upward component of pressure is applied to the horizontal stem of the adaptor 12 by means of a pair of arcuate spring wires 39, the upper ends of which are hooked to lugs 40 on the base plate 2, while their lower ends are pivotally engaged with the collar 34.

Figure 2:
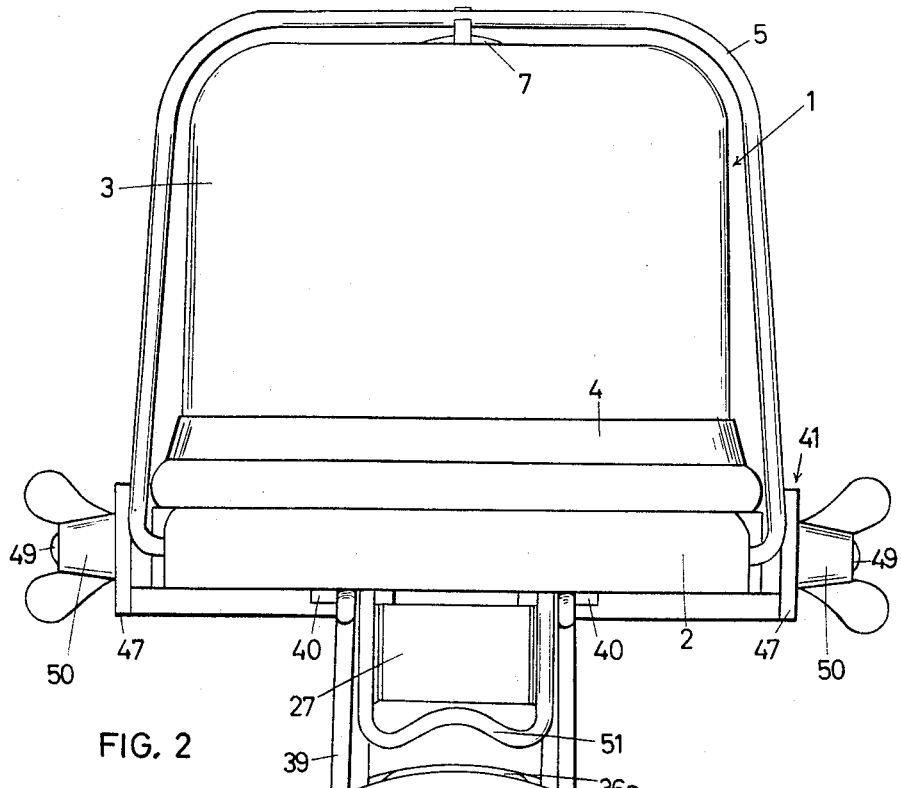
FIG. 2 is a front elevational view of the indicator.
Figure 2:
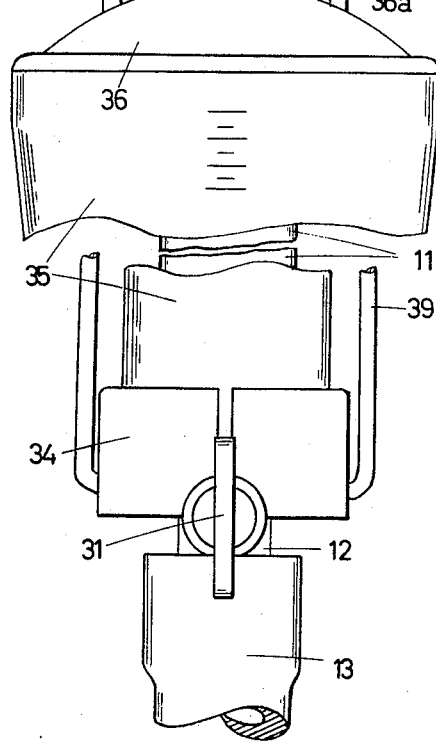
Figure 5:
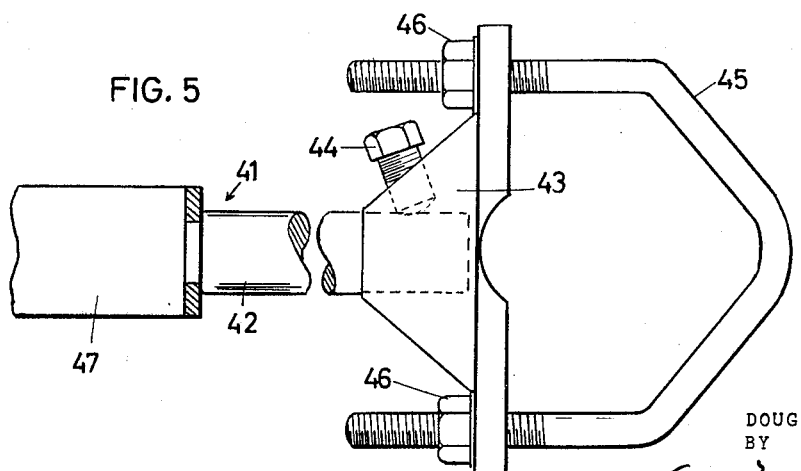
FIG. 5 is a side elevational view of part of supporting means for the indicator.

The milk yield indicator as a whole is suspended in a convenient position in the milking shed by means of a bracket generally indicated at 41 in FIGS. 1, 2 and 5. In the embodiment illustrated the bracket is so constructed that the milk yield indicator is adjustable for distance from the support to which the bracket is secured and also for leveling the head portion 1. To this end, the bracket includes a stem 42 (FIG. 5), one end portion of which is engaged slidably and rotatably in a hole in a plate 43, the stem being locked to the plate by means of a set screw 44. The plate 43 is fitted with a shacklebolt 45 having screw-threaded ends to which nuts 46 are applied, this arrangement enabling the bracket to be clamped to a rail or post in the milking shed. To the other end of the stem 42, there is secured a bifurcated member, the arms 47 of which straddle the head portion 1 of the milk yield indicator and are formed with slots 48 (FIG. 1) in which engage screw-threaded studs 49 projecting in opposite radial directions from the base plate 2, the studs being fitted with wing nuts 50 (FIG. 2) for locking the milk yield indicator firmly to the arms 47.

Where a wall of the milking shed forms a convenient fixture for the bracket 41, the shacklebolt 45 and its nuts 46 are dispensed with, the plate 43, then being fastened to the wall by passing screws or bolts through the holes left in the plate as a result of removal of the shackle-bolt 45.

When the milk yield indicator has been connected up to the milk cup claw by means of the tubing 13 and to the milk line 19 by means of the hose 18, an indication of the total quantity of milk delivered by a cow as a result of a complete milking operation is obtained as follows:

The cock 31 is first turned in a direction for closing the hole 37 in the bottom of the flask 35, the inflations forming part of the milk cup claw then being applied to the teats of the animal. Each pulsation of the milking machine will cause a jet of milk and air to rise through the inlet nozzle 10 and issue from the upper end of the nozzle. The part of the issuing jet that is represented by air will be drawn out of the chamber 1a through the outlet tube 16 and thus becomes separated from the milk itself, the air then passing into the milk line 19 under the suction effect of the vacuum pump of the milking machine. The remaining part of the issuing jet, represented by milk, will impinge on the center part of the concave face of the dome 7 and become spread as an even film over the face. When the milk film reaches the rim 7a of the concave face of the dome 7, it will descend as an annular curtain from the rim. The curtain of milk might not be even under all operating conditions unless an even skin of milk is created on the inside of the nozzle adjacent to the exit. It is necessary that the means for creating this even skin of milk does not introduce undue restriction to the flow of milk and also that the means can be readily cleaned by passing a brush through the inlet tube. One preferred means for creating this even skin of milk without introducing undue restriction to the flow of milk or cleaning brush, consists in imparting to the flow of milk a centrifugal force. As shown in FIG. 1, this effect may be produced by forming the upper part of the hole 9 in the spigot 8 with a series of inwardly projecting helical fins 52 which act to impart a rotational movement to the milk and air as they enter the bore of the nozzle 10. This rotational movement will tend to create the even skin of milk on the inside wall of the nozzle by forming a skin of milk which, as it travels up the nozzle and as a result of the combination of the centrifugal force and of the air passing through the nozzle, the skin will become more even in thickness as it approaches the outlet of the nozzle. It will, of course, be understood that the thickness of the skin will depend on the rate of flow of milk through the nozzle and that the combination of the centrifugal force and flow of air through the nozzle will overcome light forces of gravity and allow this skin of milk to be even although the nozzle might not be in a truly vertical position. As the concave face of the dome is of constant geometrical shape in all its cross sections and the jet of milk from the inlet nozzle 10 impinges on the exact center part of this face, the quantity of milk in each part of the descending curtain will be substantially constant throughout the circumference of the curtain. As the upper end of the tubular divider 22 lies directly below a part of the rim 7a of the concave face of the dome 7, an exact proportion of the milk in the curtain will pass into the divider, this part of the milk then flowing past the ball valve 28 into the flask 35. The level of milk collected in the flask will rise as milking proceeds and when the milking operation is at an end the total quantity of milk delivered by the cow will be indicated by comparing the level of the milk in the flask with the graduations marked on the flask. The part of the milk in the descending curtain that has not been received by the divider 22 and thus collected in the flask 35, will simply fall onto the part of the base plate 2 lying within the confines of the cap 3, this part of the milk then flowing through the slot or slots 17 in the lower end of the outlet tube 16 so that it will pass to the milk line 19 for discharge and collection in the ordinary way.

When a reading has been taken from the flask 35 at the completion of a milking operation and it is desired to empty the flask ready for the next milking operation, the cock 31 is turned to a position in which the hole 37 in the bottom of the flask is placed in communication with the bore of the adaptor 12 and thus with the bore of the hose 11. The flask 35, with its lid 36, is now pressed downwardly against the pressure of the spring wires 39, the flexible nature of the hose 11 allowing the adaptor 12 to rock downwardly concomitantly. The neck 36a of the lid 36 thus becomes released from the sealing ring 30, thereby allowing outside air to flow into the flask with the result that the milk in the latter is forced through the holes 37 in the bottom of the flask, through the bore of the adaptor 12 and into the tubing 11. When emptying has been completed, the flask can be allowed to rise again to reestablish the leakproof connection between the neck 36a and the sealing ring 30.

When the flask is emptied in the manner described above, the sample is redirected into the tubing 11 and a proportionate sample of such redirected milk will enter the flask which will result in a small error in the reading of the yield of the next cow being milked. However, since the proportion of milk entering the flask in relation to the total yield is generally in the range of one to forty, and if the total yield from a cow is 10 pounds, then the readable error would amount to only ¼ pound. Should the user desire greater accuracy, a second release of the sample can be made before milking is commenced. This will result in an indicated error amounting to only approximately one-tenth of an ounce of the total yield which for most purposes is negligible.

Should it be desired to remove the empty flask 35 from the milk yield indicator this can be done by pushing the flask downwardly to release the neck 36a from the sealing ring 30 as previously mentioned, then tilting the flask forwardly, and then lifting it so that its lower end is freed from the nipple 33 on the adaptor 12.

Application of the initial downward movement for partly or wholly removing the flask 35 can be facilitated by the provision of a U-shaped lever 51, the side arms of which are pivotally connected to the base plate 2, while the crotch portion can be pressed downwardly by one hand onto the lid 36, the other hand then being used for steadying the flask and, if desired, finally withdrawing it from engagement with the nipple 33.

Provision of the ball valve 28 and its seating 26 enables the flask 35 to be partly or wholly removed without loss of vacuum, the result being that the milking machine can be kept operating efficiently during either of these times. When the sealing effect between the neck 36a of the lid 36 of the flask 35 and the sealing ring 30 is broken by downward movement of the flask, the outside atmospheric pressure then exerted on the underside of the ball valve 28, coupled with the lower pressure existing in the chamber 1a under the influence of suction from the milk line 19, will cause the valve 28 to move upwardly into engagement with the seating 26, thus closing the chamber 1a against inflow of outside air.

Figure 3:
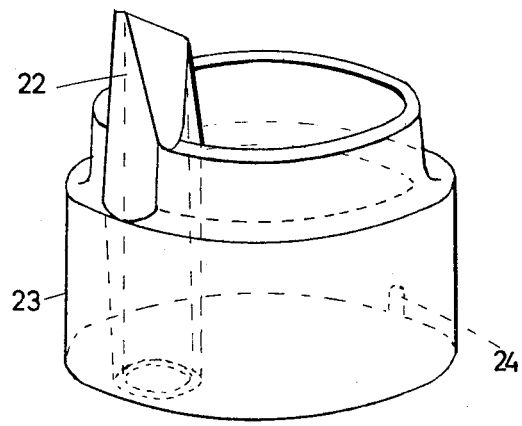
FIG. 3 is a perspective view of an internal part of the upper or head portion of the indicator.
Figure 4:
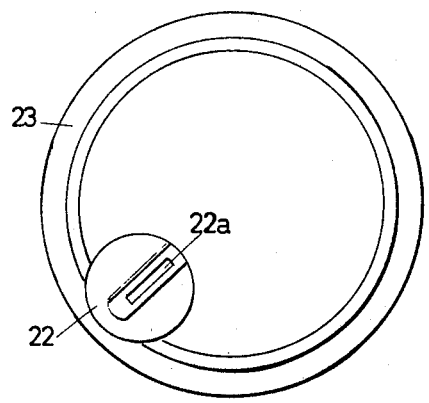
FIG. 4 is a plan view of the part illustrated in FIG. 3.

As best shown in FIGS. 3 and 4, the upper end portion of the divider 22 may be flattened somewhat so that the opening in the upper end of the divider is in the form of a narrow slot 22a extending diametrically with respect to the axis of the cap 3. In this way and without making the divider of inordinately small cross-sectional size, it becomes possible to divert only a small quantity of milk from the descending curtain into the flask 35, thus permitting use of a flask of reasonably small capacity.

The interior of the milk yield indicator when constructed as described and illustrated can, when desired, be washed using normal washing procedures with the flask 35 remaining in situ and without removal of any other part. For this purpose the cock 31 is turned to open position and the milk cup claw can be immersed in a supply of washing liquid. Operation of the milking machine will then cause the washing liquid to follow the same courses through the milk yield indicator as those followed by the milk during a preceding milking operation except that, with the cock 31 in open position, part of the liquid will flow through the cock into the flask and eventually fill the flask and overflow past the ball valve 28 into the divider tube 22 and so into the chamber 1a.

A flask 35 with a hole 37 in its bottom as illustrated is suitable for use when the yield indicator is employed by a farmer for measuring the milk yield of each cow in his milking herd, it being possible to empty the flask after each milking operation without entirely removing it from the rest of the assembly.

Where the yield indicator is used by herd testers and dairy research scientists, the flask 35 is replaced by a flask having a closed bottom, the cock 31 being kept in closed position. At the end of the milking operation, the substitute flask is removed in the manner already explained with reference to the flask 35, and is replaced by another substitute flask and so on until all the cows to be tested have been milked. After suitable identification, the several filled substitute flasks can be taken away for accurate reading or weighing of their contents and for the removal of required samples for testing as to quality and purity. When the full quota of filled substitute flasks has been obtained, a flask 35 with a hole 37 in its bottom is placed in position so that the yield indicator can again be used by the farmer in the ordinary way.

Figure 6:
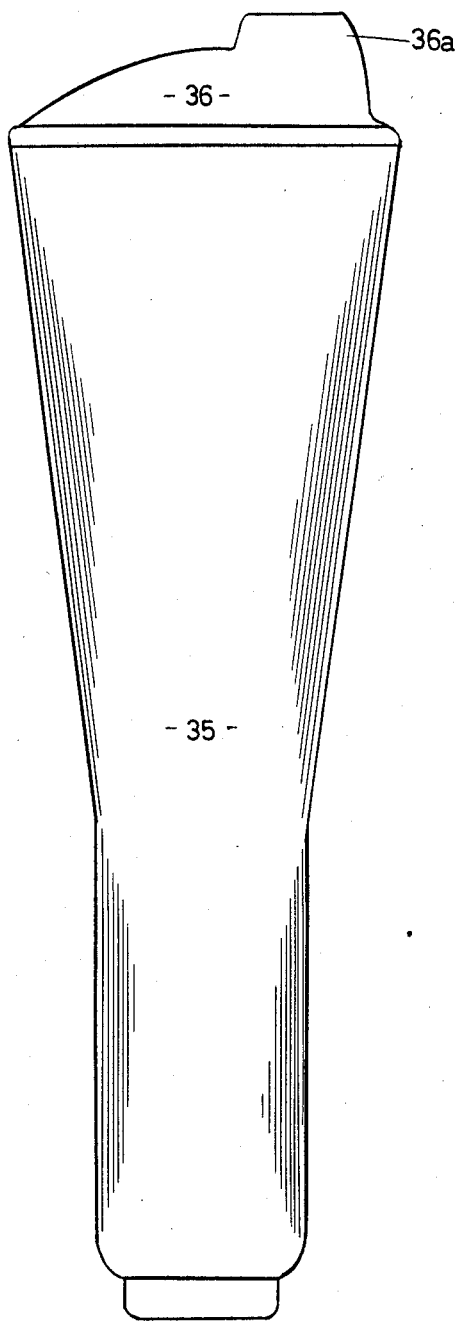
FIG. 6 is a side elevational view of the measuring flask.

As best shown in FIG. 6, the flask in the embodiment illustrated is shaped after the manner of a lager beer glass, being wider at the top than at the bottom. The flask may, however, be of any other suitable shape so long as it is possible to mark the graduations thereon suchwise that ready and accurate readings can be taken irrespective of the actual quantity of milk that has been received by the flask at the completion of a milking operation. However, the shape as illustrated is to be preferred since the lower yields can be read more accurately and a close degree of accuracy be obtained in a short measuring flask.

In FIG. 1 the yield indicator is shown to include a generally cylindrical member engaged in the space left between the side wall of the cap 3 and the annular wall member 23. This particular member, however, forms no essential part of the present invention and will therefore not be further described. In point of fact it constitutes part of the milk flow indicator described and claimed in my aforesaid U.S. patent application Ser. No. 651,505 filed on July 6, 1967.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A milk yield indicator device comprising a base plate; a cap mounted on said base plate and shaped to provide a chamber between said cap and said base plate, said cap being provided at its upper end with a dome, the concave face of which faces downwardly and has a rim spaced from the inner wall of the cap and lying within the said chamber and is of regular curvature in all cross sections; an inlet nozzle extending upwardly from said base plate so that it projects into the chamber and lies in line with the axis of the concave face of the dome, the upper end of said nozzle being spaced from the concave face of the dome, while the lower end of the nozzle is adapted for connection to a dropper or section of milk tube extending from the milk cups or milk cup claw, means associated with said inlet nozzle for creating a substantialy even skin of milk in the bore of the inlet nozzle adjacent to the exit thereof; an outlet from said chamber adapted to be connected to the section of milk line extending to the releaser of the milking machine; a tubular divider extending upwardly from said base plate and having its upper open end lying directly beneath a part of the rim of the concave face of said dome; and a graduated measuring flask detachably connected to the lower end of the divider so that its interior is in communication with the bore of the divider.

2. A milk yield indicator device as described in claim 1 wherein the means for creating a substantially even skin of milk comprises means for imparting a centrifugal force to the upward movement of air and milk in the nozzle.

3. A milk yield indicator device as defined in claim 1 wherein the inlet nozzle has a smooth bore tapered to converge toward the outlet end thereof, said outlet end terminating within the concavity of the dome.

4. A milk yield indicator device as described in claim 1 including a normally open ball valve interposed between said tubular divider and said measuring flask for preventing air from entering said chamber through the lower end of the divider while the interior of the chamber is under reduced pressure, and the measuring flask is being removed from the lower end of the divider.

5. A milk yield indicator device in accordance with claim 1 including a depending length of hose connected at its upper end to the lower end of said inlet nozzle, the lower end of the hose being connected to one branch of the head of a reclining T-shaped tubular adaptor while the other branch of the head of the adaptor is adapted for connection by means of a flexible tubing, to the milk cups or milk cup claw of a milking machine.

6. A milk yield indicator device in accordance with claim 1 including means for adjustably supporting the device in a convenient position in a milking shed.

7. A milk yield indicator device as described in claim 2 wherein said latter means for imparting a centrifugal force consists of a series of inwardly projecting helical fins placed in the flow of air and milk.

8. A milk yield indicator device as described in claim 7 wherein said fins are formed in the bore of a spigot formed in said base plate below and in communication with said inlet nozzle.

9. A milk yield indicator device as claimed in claim 5 including a bib cock, the stem of said adaptor being fitted with the plug portion of said bib cock, said plug portion containing a passageway so shaped that in one positon of the cock, the bore of the stem will be placed in communication with a hole extending upwardly from the stem while in another position of the cock the said hole will be closed by said plug portion.

10. A milk yield indicator device as claimed in claim 9, wherein said flask is detachably mounted intermediate the lower end of the divider and the hole in the horizontal stem of the adaptor, the top of said flask having an opening in communication with the bore of said divider while the bottom of the flask is formed with a hole to register with the hole in the stem of said adaptor.

References Cited

UNITED STATES PATENTS

| 3,241,372 | 3/1966 | Maxwell. | |
| 3,272,010 | 9/1966 | Johnson | 73—202 |
| 3,308,669 | 3/1967 | Grise et al. | 73—202 X |
| 3,349,617 | 10/1967 | Hartstone | 73—202 |
| 3,349,618 | 10/1967 | Maxwell | 73—202 |

RICHARD C. QUEISSER, Primary Examiner

R. S. SALZMAN, Assistant Examiner